United States Patent [19]

Sasamoto et al.

[11] Patent Number: 4,666,720

[45] Date of Patent: May 19, 1987

[54] PROCESS FOR PREPARING PRAWN-LIKE FOOD

[75] Inventors: Yasuhiko Sasamoto; Takeo Atsumi; Shin Suzuki; Masakazu Hoshi, all of Tokyo, Japan

[73] Assignee: Taiyo Fishery Co., Ltd., Tokyo, Japan

[21] Appl. No.: 749,634

[22] Filed: Jun. 28, 1985

[30] Foreign Application Priority Data

Jul. 31, 1984 [JP] Japan .................................. 59-161398

[51] Int. Cl.$^4$ .............................................. A23L 1/325
[52] U.S. Cl. ..................................... 426/104; 426/574; 426/643
[58] Field of Search ............... 426/104, 574, 641, 643, 426/645, 646, 656, 657, 661, 448, 516, 802

[56] References Cited

U.S. PATENT DOCUMENTS 4,000,331 12/1976 Tanaka et al. ...................... 426/574
4,439,456 3/1984 Kammuri et al. .................... 426/643
4,490,397 12/1984 Maurice et al. ...................... 426/574

OTHER PUBLICATIONS

Ho et al. 1983 Dehydration Of Foamed Fish (Sardine)–Starch Paste by Microwave Heating 1 Formulation And Processing Conditions Chemical Abstracts 98: 177691a.

Primary Examiner—Raymond N. Jones
Assistant Examiner—Carolyn Paden
Attorney, Agent, or Firm—Birch, Stewart, Kolasch & Birch

[57] ABSTRACT

Prawn-like food which exhibits a texture closely similar to that of prawns is prepared by adding foamed food starch material optionally containing protein to salted ground fish meat and molding the obtained mixture followed by heating.

20 Claims, No Drawings

PROCESS FOR PREPARING PRAWN-LIKE FOOD

BACKGROUND OF THE INVENTION

1. Field of the Invention

The present invention relates to a process for preparing prawn-like food.

2. Background of the Invention

Food products made of artificial materials, i.e. different from the original ones, to imitate the latter have recently found their place in the food market. In particular, both domestic and commercial consumption of these products having a prawn-like, crab-like or scallop-like texture have been increasing. Also, there is a demand for these products as health food, since they are mainly prepared from ground white fish meat so that they contain a large amount of protein and a small amount of fat.

Among these copy products, particular attention will now be turned to prawn-like food. This food has been conventionally prepared by adding pieces of Kamaboko, which is an elastic gel product prepared by adding salt to ground fish meat followed by mashing and molding, to ground fish meat and mixing.

However, conventional prawn-like food prepared by conventional techniques would exhibit a Kamaboko-like texture which is completely different from that of prawns.

SUMMARY OF THE INVENTION

Accordingly, it is an object of the present invention to provide a process for preparing prawn-like food which makes it possible to supply inexpensive prawn-like food having texture characteristics of prawns without the disadvantages described in the prior art.

As a result of our various research to improve the Kamaboko-like texture of the conventional prawn-like food, the present inventors have found that replacement of the Kamaboko-pieces by (a) a foamed starch material and/or (b) a foamed material of starch and protein mixed together would result in the formation of a new three-dimensional structure of these materials in the ground fish meat and harmony between the smooth texture of the ground fish meat and that of the foamed material to thereby provide prawn-like food which exhibits the crispy texture characteristic of prawns without the elastic and Kamaboko-like texture observed in conventional one.

Accordingly, the process of the present invention for preparing prawn-like food comprises (1) adding a foamed starch material (optional containing protein) to salted ground fish meat and (2) molding the obtained mixture followed by heating.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Examples of the starch material as used in the present invention include wheat, potato, pea (green gram), and rice starches. On the other hand, not only animal protein obtained from, e.g. fishes, but vegetable protein may be used in the present invention.

In one embodiment of the present invention, a foamed food material is first prepared by foaming the above mentioned starch material optionally containing the above mentioned protein. Protein may be added to starch to thereby give a texture further imitating that of prawns. Protein may be added generally in an amount of 300 parts by weight or less, preferably 50 to 250 parts by weight, based on 100 parts by weight of starch. The starch material, optionally containing protein, may be foamed by frying, pressure control or extrusion. Prior to the foaming, pretreatments or formulation may be carried out if desired. For example, the starch material, optionally containing protein, may be formulated into fibers or particles of approximately 0.5 to 1.2 mm in diameter and adjusted to a water content of 8% or below, preferably 3 to 5%, prior to foaming. The conditions under which the foaming is carried out depend on the starch material optionally containing protein to be foamed and the aimed texture of the final product. The material may be preferably foamed by frying at approximately 160° to 200° C. for approximately 2 to 10 sec. When an extruder is used, no pretreatment is usually required. However, it is preferable to adjust the water content of the material to be foamed to 10 to 30%. The material is generally foamed to give a volume approximately 5 to 10 times as large as that of the unfoamed material.

In the process of the present invention, the foamed food material thus obtained is cut into pieces or ground, if necessary, and added to ground fish meat which has been previously salted. The ground fish meat as mentioned above may be preferably those prepared from Alaska pollack, Alaska cod, Hoki, Hake and the like without any limitation. The ground fish meat may be seasoned during salting, if necessary. The foamed material may be cut into pieces or ground to give fibers or particles of preferably 1 to 5 mm at the longest side. When the final product is one which is reheated before serving, e.g., fried or tempura, the foamed material is preferably cut into fibers or particles of 3 to 5 mm at the longest side, while it is preferably cut into fibers or particles of 1 to 4 mm when taken without reheating. The foamed material may be preferably added to the ground fish meat in an amount of 6 to 15 parts by weight per 100 parts by weight of the ground fish meat. When the final product is one which is reheated before serving, the foamed material is added in an amount of preferably 8 to 15 parts by weight, more preferably 10 to 12 parts by weight, per 100 parts by weight of the ground fish meat. On the other hand, it is preferably added in an amount of 6 to 12 parts by weight, more preferably 8 to 10 parts by weight, per 100 parts by weight of the ground fish meat when taken as such. A larger or smaller amount would make it difficult to obtain the product of the present invention which exhibits a prawn-like texture.

The mixture of the foamed food material and salted ground fish meat as obtained above is molded into a product having appropriated sizes and shapes, such as the one similar to prawn, and heated to give the prawn-like food according to the present invention. This molding may be carried out by the use of conventional molds. The heating is carried out to coagulate the protein in the fish meat. More particularly, a molded product may be heated to 70° to 100° C. at its central part for preferably 30 sec. to 20 min., more preferably 30 sec. to 10 min., by the use of boiling water, steam, high frequency or similar procedures.

The prawn-like food, thus prepared, exhibits a crispy texture characteristic of prawns without the elastic and Kamaboko-like texture of the conventional products and may be served in this state or after being reheated. The excellent texture of the prawn-like food of the present invention as described above results from a new three-dimensional structure in the ground fish meat formed by adding the foamed food material and harmony between the smooth texture of the ground fish meat and the hard texture of the foamed food material.

To further illustrate the present invention, the following examples will be given.

EXAMPLE 1

Rice starch was formulated into fibers of approximately 0.5 mm in diameter, adjusted to a water content of 4% and fried in soybean oil at 180° C. for 5 sec. to foam. Then it was cut into pieces of approximately 5 mm at the longest side. The foamed food material thus prepared was added to salted and seasoned ground fish meat in an amount of 2, 4, 6, 8, 10, 12 and 15 parts by weight per 100 parts by weight of the ground fish meat. Each mixture thus obtained was molded into the shape of prawn and boiled in water at 100° C. for 1 min. to yield prawn-like food.

The texture of the prawn-like food thus prepared was compared with that of a peeled prawn boiled in water at 100° C. for 1 min. Prawn-like food prepared by adding 6, 8, 10, 12 parts by weight of the foamed material exhibits textures particularly close to that of prawn.

EXAMPLE 2

Potato starch was formulated into fibers of 1 mm in diameter, adjusted to a water content of 5% and fried in soybean oil at 190° C. for 10 sec. to foam. Then it was cut into pieces of approximately 5 mm at the longest side. 10 parts by weight of the foamed food material thus obtained was added to 100 parts by weight of seasoned and salted ground Alaska pollack meat and the mixture was molded and heated in the same manner as described in Example 1 to obtain prawn-like food.

The obtained prawn-like food was mixed with vegetables to prepare a seafood salad. It was evaluated as excellent because of the favorable texture and flavor of the prawn-like food.

EXAMPLE 3

Wheat starch was formulated into fibers of 0.8 mm in diameter, adjusted to a water content of 4% and fried in soybean oil at 190° C. for 5 sec. to foam. Then it was cut into pieces of approximately 5 mm at the longest side. 10 parts by weight of the food material thus prepared was added to 100 parts by weight of salted and seasoned ground Alaska pollack meat and the mixture was molded and heated in the same manner as described in Example 1 to obtain prawn-like food.

The obtained prawn-like food was mixed with vegetables to prepare a seafood salad. It was evaluated as excellent because of the favorable texture and flavor of the prawn-like food.

EXAMPLE 4

Potato starch was formulated into fibers of 0.7 mm in diameter, adjusted to a water content of 4% and fried in soybean oil at 190° C. for 10 sec. to foam. Then it was cut into pieces of approximately 5 mm at the longest side. 10 parts by weight of the food material thus prepared was added to 100 parts by weight of salted and seasoned ground Alaska pollack meat and the mixture was molded and heated in the same manner as described in Example 1 to obtain prawn-like food.

The obtained prawn-like food was mixed with vegetables to prepared a seafood salad. It was evaluated as excellent because of the favorable texture and flavor of the prawn-like product.

EXAMPLE 5

Pea starch was formulated into fibers of 0.6 mm in diameter, adjusted to a water content of 4% and fried in soybean oil at 200° C. for 5 sec. to foam. Then it was cut into pieces of approximately 5 mm at the longest side. 8 parts by weight of the food material thus prepared was added to 100 parts by weight of salted and seasoned ground Alaska pollack meat and the mixture was molded and heated in the same manner as described in Example 1 to obtain prawn-like food.

The obtained prawn-like food was mixed with vegetables to prepare a seafood salad. It was evaluated as excellent because of the favorable texture and flavor of the prawn-like product.

EXAMPLE 6

A mixture of rice starch and soybean protein at a weight ratio of 1:2 was formulated into fibers of 0.7 mm in diameter, adjusted to a water content of 4 % and fried in soybean oil at 180° C. for 6 sec. to foam. Then it was cut into pieces of approximately 6 mm at the longest side. 8 parts by weight of the food material thus prepared was added to 100 parts by weight of salted and seasoned ground Alaska pollack meat and the mixture was molded and heated in the same manner as described in Example 1 to obtain prawn-like food.

The obtained prawn-like food was evaluated by 10 panelists. The result is as follows:

| | |
|---|---|
| closely similar to prawns | 2 |
| considerably similar to prawns | 6 |
| somewhat similar to prawns | 2 |
| completely different from prawns | 0 |

EXAMPLE 7

A mixture of wheat starch and soybean protein at a weight ratio of 1:1 was formulated into fibers of 0.8 mm in diameter, adjusted to a water content of 4 % and fried in soybean oil at 180° C. for 10 sec. to foam. Then it was cut into pieces of approximately 5 mm at the longest side. 10 parts by weight of the food material thus prepared was added to 100 parts by weight of salted and seasoned ground Alaska pollack meat and the mixture was molded and heated in the same manner as described in Example 1 to obtain prawn-like food.

The obtained prawn-like food was evaluated by 10 panelists. The result is as follows:

| | |
|---|---|
| closely similar to prawns | 1 |
| considerably similar to prawns | 7 |
| somewhat similar to prawns | 2 |
| completely different from prawns | 0 |

EXAMPLE 8

A mixture of potato starch and soybean protein at a weight ratio of 1:0.5 was formulated into fibers of 1.0 mm in diameter, adjusted to a water content of 4 % and fried in soybean oil at 180° C. for 8 sec. to foam. Then it was cut into pieces of approximately 6 mm at the longest side. 10 parts by weight of the food material thus prepared was added to 100 parts by weight of salted and seasoned ground Alaska pollack meat and the mixture was molded and heated in the same manner as described in Example 1 to obtain prawn-like food.

The obtained prawn-like food was evaluated by 10 panelists. The result is as follows:

| | |
|---|---|
| closely similar to prawns | 1 |
| considerably similar to prawns | 8 |
| somewhat similar to prawns | 1 |
| completely different from prawns | 0 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for preparing prawn-like food having a crispy texture which comprises the steps of:
    adding a sufficient amount of foamed starch material to salted ground fish meat to form a mixture whereby said mixture upon molding and subsequently heating possesses the desired characteristics;
    molding the mixture into a product having a predetermined size and shape; and
    heating the molded product for a time and temperature sufficient to produce a prawn-like food product having a crispy texture.

2. A process for preparing prawn-like food as set forth in claim 1, wherein the starch material is foamed by frying at 160° to 200° C. for approximately 2 to 10 sec.

3. A process for preparing prawn-like food as set forth in claim 2, wherein the foamed starch material contains protein.

4. A process for preparing prawn-like food as set forth in claim 2, wherein the starch material is formulated into fibers or particles of approximately 0.5 to 1.2 mm in diameter and adjusted to a water content of 8 % or below prior to frying.

5. A process for preparing prawn-like food as set forth in claim 4, wherein the foamed starch material contains protein.

6. A process for preparing prawn-like food as set forth in claim 1, wherein the starch material is foamed with an extruder to give a volume approximately 5 to 10 times as large as that of the unfoamed material.

7. A process for preparing prawn-like food as set forth in claim 6, wherein the starch material is adjusted to a water content of 10 to 30 % prior to foaming.

8. A process for preparing prawn-like food as set forth in claim 7, wherein the foamed starch material contains protein.

9. A process for preparing prawn-like food as set forth in claim 6, wherein the foamed starch material contains protein.

10. A process for preparing prawn-like food as set forth in claim 1, wherein 6 to 15 parts by weight of the foamed food material is added to 100 parts by weight of the ground fish meat.

11. A process for preparing prawn-like food as set forth in claim 10, wherein the foamed starch material contains protein.

12. A process for preparing prawn-like food as set forth in claim 1, wherein the foamed food material is cut or ground into fibers or particles of 1 to 5 mm in the longest side prior to the addition to the ground fish meat.

13. A process for preparing prawn-like food as set forth in claim 12, wherein the foamed starch material contains protein.

14. The process for preparing prawn-like food as set forth in claim 1, wherein the foamed starch material contains protein.

15. A process for preparing prawn-like food as set forth in claim 14, wherein 50 to 250 parts by weight of protein is added to 100 parts by weight of starch.

16. A process for preparing prawn-like food as set forth in claim 14, wherein the protein is soybean protein.

17. A process for preparing prawn-like food as set forth in claim 1, wherein the foamed starch material is a member selected from the group consisting of rice starch, potato starch, wheat starch and pea starch.

18. A process for preparing prawn-like food as set forth in claim 1, wherein the fish meat is a member selected from the group consisting of Alaskan pollack meat, Alaskan cod, Hoki and Hake.

19. A process for preparing prawn-like food having a crispy texture which consists essentially of the steps of:
    adding a sufficient amount of foamed starch material to salted ground fish meat to form a mixture whereby said mixture upon molding and subsequently heating possesses the desired characteristics;
    molding the mixture into a product having a predetermined size and shape; and
    heating the molded product for a time and temperature sufficient to produce a prawn-like food product having a crispy texture.

20. A process for preparing prawn-like food having a crispy texture which consists essentially of the steps of:
    adding 6 to 15 parts by weight of a foamed starch material to 100 parts by weight of salted ground fish meat to form a mixture;
    molding the mixture into a product having a predetermined size and shape; and
    heating the molded product at 70° to 100° C. for 30 seconds to 20 minutes to produce a prawn-like food product having a crispy texture.

* * * * *